United States Patent

[11] 3,562,619

[72] Inventors Hisamoto Hyoguchi;
Taka-aki Kanamori; Yasutsugu Kuroda,
Kamakura, Japan
[21] Appl. No. 784,842
[22] Filed Dec. 18, 1968
[45] Patented Feb. 9, 1971
[73] Assignee Mitsubishi Denki Kabushiki Kaisha
Tokoyo, Japan
[32] Priority Dec. 22, 1967
[33] Japan
[31] 42/82342

[54] A CONTROL SYSTEM FOR SELECTIVELY POSITIONING AN OUTPUT MEMBER
4 Claims, 9 Drawing Figs.
[52] U.S. Cl. .................................................. 318/603,
318/604, 318/605
[51] Int. Cl. .................................................. G05b 1/06
[50] Field of Search ........................................... 318/20.320,
20.330, 20.340

[56] References Cited
UNITED STATES PATENTS
3,175,138  3/1965  Kilroy et al. .................. 318/18X
3,400,314  9/1968  Wilson ......................... 318/18

Primary Examiner—B. Dobeck
Attorneys—Robert E. Burns and Emmanuel J. Lobato

ABSTRACT: During movement of a machine table, pulses of fixed repetition frequency are counted to be converted to a phase angle which is, in turn, compared with a phase angle corresponding to the movement of the movable table until a difference between them reaches zero. The pulses are also counted by a position counter to decrease a digital value registered in it. As the counter decreases in value the table automatically switches its speed from a high to a moderate magnitude and then to a low speed when the counter clears the table stops at its command position. Also, after having reached a predetermined distance from the command position, the table can progressively decelerate in accordance with the value remaining in the counter.

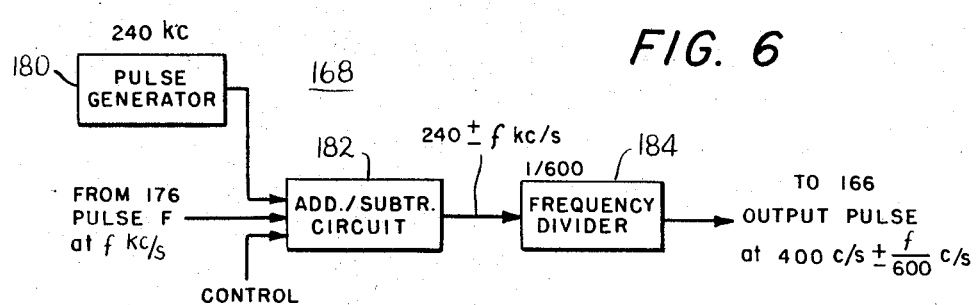
FIG. 6
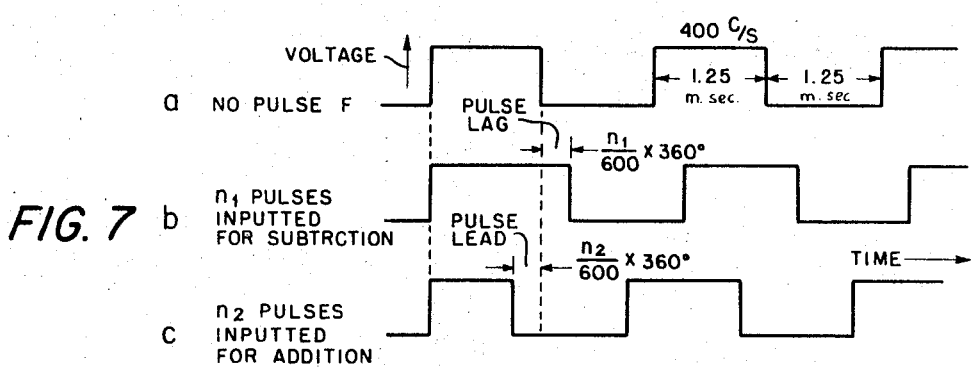
FIG. 7
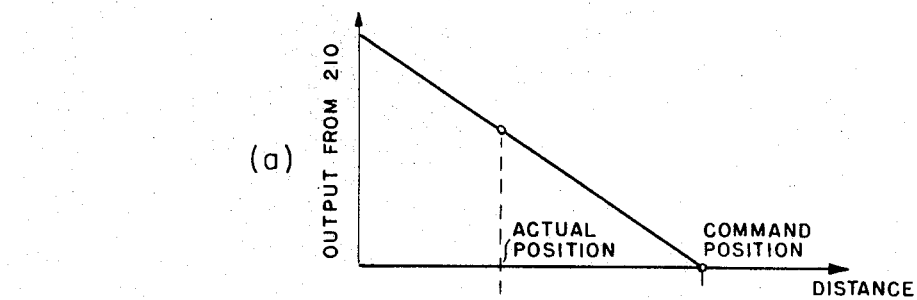
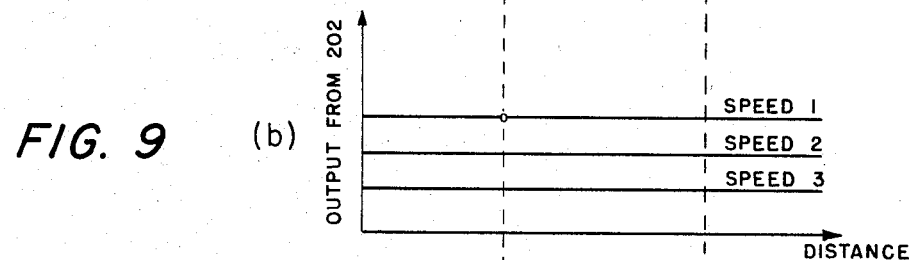
FIG. 9
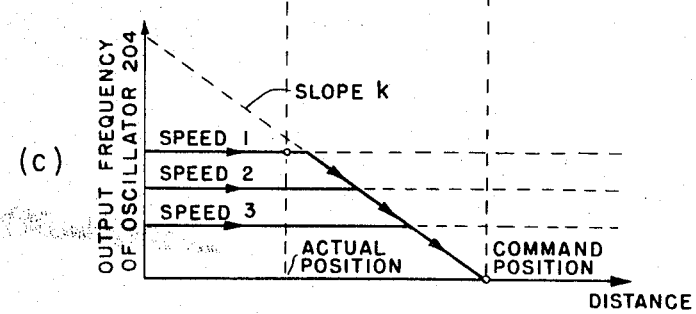

3,562,619

A CONTROL SYSTEM FOR SELECTIVELY POSITIONING AN OUTPUT MEMBER

BACKGROUND OF THE INVENTION

This invention relates to improvements in a locating device for use in numerical control of machine tools.

In numerical controls of machine tools it has been previously practiced to locate a controlled member involved at its command position by using a pulse transmitter to convert a mechanical quantity representative of movement of the controlled member directly to the number of pulses delivered by the transmitter while utilizing an information instructing a distance by which the controlled member is to be moved at a time. Also a suitable resolver could be used to detect an analogue magnitude corresponding to the above-mentioned mechanical quantity which magnitude is, in turn, converted to pulses while utilizing an information instructing a distance of the controlled member between the just preceding and command positions. Those prior art practice have been found disadvantageous in the accuracy of location and others.

SUMMARY OF THE INVENTION

Accordingly it is an object of the invention to provide a new and improved locating device for use in numerical control of machine tools employing a single resolver most cheap among the existing types of position detectors without the necessity of providing any physically movable control and/or measurement elements other than the resolver whereby it is inexpensive and high in reliability while being capable of presetting a decelerating distance for a controlled member involved at will thereby to decrease a locating time.

With this object in view, the invention resides in a locating device for locating a movable member at its command position comprising analogue position detector means for detecting a magnitude of movement of the movable member in analogue manner, a position counter for registering a position information instructing the command position and performing the counting down operation in accordance with movement of the movable member and means operative to switch the movable member from its high to its moderate speed and thence to its low speed in response to the output from the position counter until the movable member stops at the command position upon the position counter clearing, characterized by a pulse oscillator for producing pulses at a predetermined constant pulse repetition frequency, pulse counter means for counting the pulses from the pulse oscillator through a gate circuit, a digital-to-analogue converter for converting the output from the pulse counter to an analogue quantity, and difference detector means for comparing the output from the analogue position detector means with the analogue output from the digital-to-analogue converter to detect whether or not a difference exists therebetween and the detector means being operative in the presence of the difference between both the outputs to gate the gating circuit to permit the pulses from the pulse oscillator to pass therethrough.

The analogue position detector means may preferably include a resolver.

The pulse counter and the digital-to-analogue converter may advantageously consist of a pulse generator for generating pulses at a predetermined constant pulse repetition frequency, a pulse counting circuit connected to the pulse generator to count up the pulses therefrom, and having applied thereto the pulses passed through the gate circuit to count them in one of the up and down direction dependent upon a control signal applied thereto to produce the corresponding pulse repetition frequency, and a frequency divider circuit connected to the pulse counting circuit to divide the pulse repetition frequency therefrom by a predetermined number.

BRIEF DESCRIPTION OF THE DRAWINGS

The invention will become more readily apparent from the following detailed description taken in conjunction with the accompanying drawings in which:

FIG. 6 is a block diagram of a digital phase modulator which may be used in practicing the invention;

FIG. 7 is a graph illustrating various waveforms of output selectively provided by the modulator shown in FIG. 6;

FIGS. 9a, b, and c are speed curves obtained with the arrangement shown in FIG. 8.

DESCRIPTION OF THE PREFERRED EMBODIMENT

Figure 1:
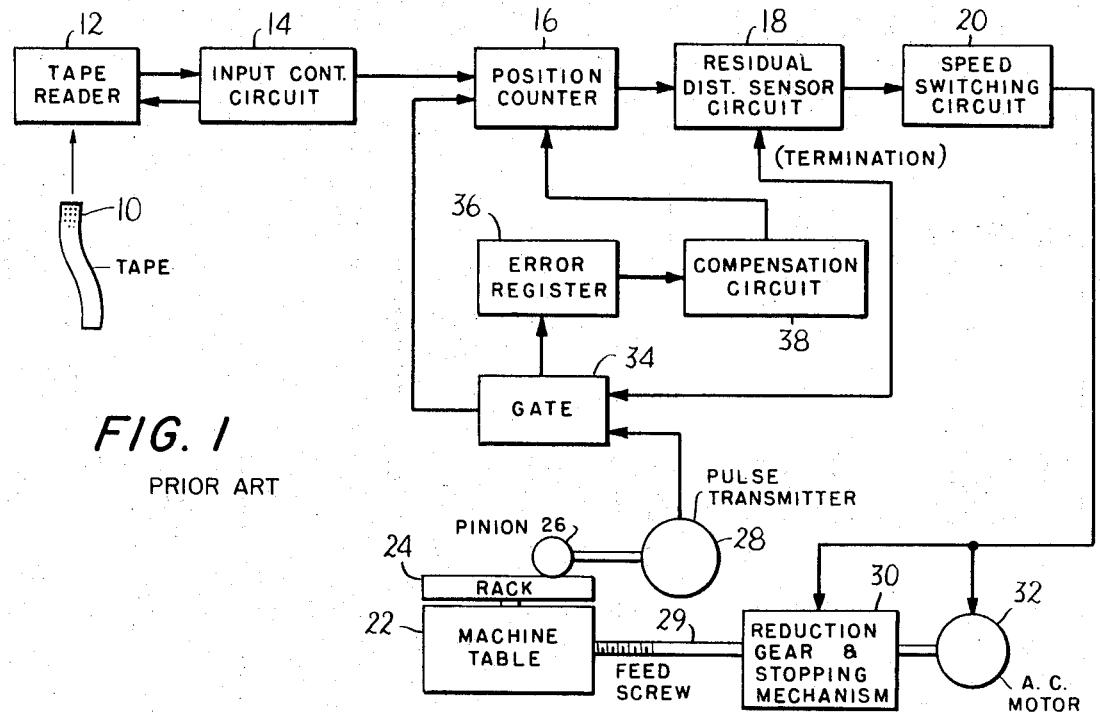
FIG. 1 is a block diagram of a locating device for use in numeral control of machine tools constructed in the principles of the prior art.

Referring now to FIG. 1 of the drawings there is illustrated one form of a locating device constructed in the principles of the prior art. The device illustrated is designed and arranged to use a numerical information representing a distance by which a movable or controlled member such as a workpiece or a cutting tool is to be moved at a time. Such an information may be sometimes called a relative value information in the sense that the digital value thereof corresponds to the particular distance of movement of the controlled member. A tape 10 shown as being a punched tape is adapted to be stepwise fed into a tape reader 12 where a position information is read out which represents a distance by which a controlled member involved is to be moved at a time. The position information thus read out is applied through an input control circuit 14 to a position counter 16 where it is registered. The position counter 16 is connected to a residual distance sensor circuit 18 operative to successively compare the digital value contained in the position counter 16 with reference digital values initially established in the sensor circuit to determine which of both the compared digital values is greater and to sense when the counter 16 clears away. The sensor circuit is connected to a speed switching circuit 20.

Further FIG. 1 shows a movable output member comprising a machine table 22 having positioned thereon a controlled member (not shown) and fixed thereto a rack member 24 which, in turn, meshes a pinion gear 26. Mechanically connected to the pinion gear 26 is a pulse transmitter 28 for measuring an angle through which the pinion gear 26 has been rotated from the reference position thereof. The machine table 22 is adapted to be translated along a feed screw 29 which is, in turn, operatively coupled through a reduction gearing and stop mechanism 30 to an AC motor 32.

The above-mentioned speed switching circuit 20 is connected to the motor 32 to turn it on and off and is also connected to the reduction and stop mechanism 30 to turn on and off an electromagnetic clutch contained in the mechanism. Thus the speed switching circuit 20 is responsive to the particular digital value contained in the position counter 16 through the residual distance sensor circuit 18 to cause the motor 30 to selectively translate the machine table 22 at a high, moderate and low speeds through the mechanism and feed screw 30 and 29 respectively while stopping the table 22 upon the digital value in the position counter 16 reaching zero. As the machine table 22 is translated, the rack member 24 is moved along with the same to rotate the pinion gear 26. Then the pulse transmitter 28 converts the angle through which the pinion gear 26 rotates into electrical pulses.

Connected to the residual distance sensor circuit 18 is a gate circuit 34 permitting normally to pass the pulses from the transmitter 28 to the position counter 16 therethrough. The counter 16 counts down the pulses applied thereto to progressively decrease the digital value contained in the counter. Since the sensor circuit 18 continues to monitor the position counter 16, the same permits the speed switching circuit 20 to automatically and successively produce speed signals as the counter 16 decreases in digital value. That is, the speed switching circuit 20 produces first a speed signal for driving the motor 32 at a high speed and then a speed signal for switching the motor 32 from the high speed to a moderate speed and another speed signal for switching the motor from the moderate speed to a low speed. Thus the machine table 22 is translated first at the high speed, then at the moderate speed and finally at the low speed.

If the sensor circuit 18 senses that the position counter 16 has cleared away, it immediately applies a termination signal to the gate circuit 34 after which the pulses from the pulse transmitter 28 are allowed to pass to an error register 36 rather than to the counter 16 for the purpose as will be apparent hereinafter. At the same time, the speed switching circuit 20 provides zero output to stop the motor 32 and therefore the machine table 22. Thereafter the tape reader 12 can read the succeeding position information out from the tape 10 to repeat the process as above described.

It will be readily understood that, after the sensor circuit 18 has produced the termination signal, the mechanical system 22—32 may run due to its inertia. In order to compensate for this running of the mechanical system in the succeeding process, the pulses from the transmitter 28 are supplied through the gate circuit 34 to an error register 36. More specifically, immediately after the succeeding position information read out by the tape reader 12 has been registered in the position counter 16, the digital value contained in the error register 36 is supplied to the position counter 16 through a compensation circuit 38 to be subtracted from the digital value due to the now registered information. Then the process as previously described is repeated starting with the difference between the digital values as above described.

The arrangement as illustrated in FIG. 1 had various disadvantages. For example, the pulse transmitter 28 was more expensive than a resolver as will be described in conjunction with FIG. 2 and required to be connected to the associated control through a great length of cable which is, in turn, apt to have external noise induced thereon. Also an increase or a decrease in the number of pulses from the transmitter will accumulate to provide an error in locating the controlled member. As the speed of the controlled member increases, a pulse repetition frequency provided by the pulse transmitter also increases. Therefore the external noise induced on the cable is difficult to be filtered out by a low-pass filter. In addition, machine tools generally produce vibrations upon acceleration, deceleration, stopping-starting and during cutting operations and these vibrations differ from one machine tool to another and have their frequencies capable of being unexpected. This results in the necessity of providing shaping and counting circuits sufficiently high in resolution. Further, a change in friction between a carriage involved and the adjacent component leads to unstable detection of the pulses.

Figure 2:
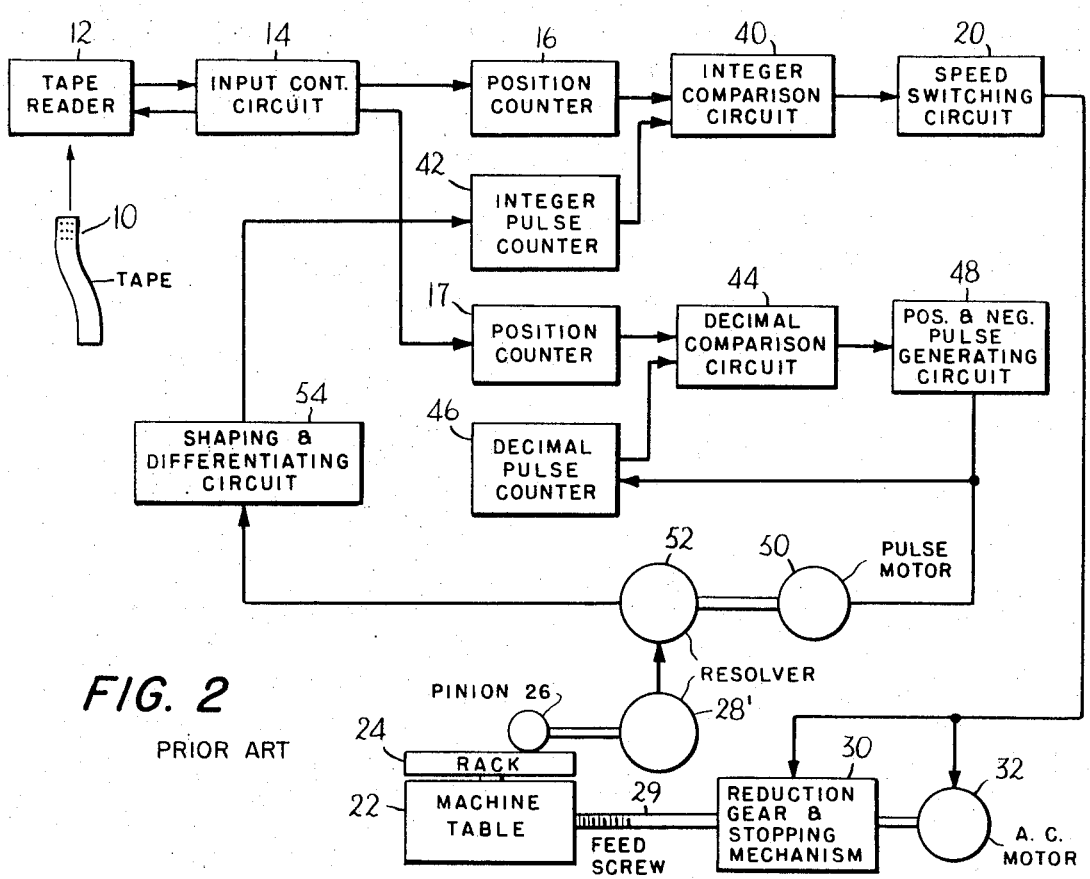
FIG. 2 is a view similar to FIG. 1 but illustrating another locating device constructed in the principles of the prior art.

Referring now to FIG. 2 wherein the same reference numerals designate the components indentical or corresponding to those illustrated in FIG. 1, there is illustrated another form of the conventional locating devices utilizing a position information representing a distance between the just preceding and a command positions of a controlled member involved. Such an information may be called an absolute value information.

An absolute value information read out from a tape 10 by a tape reader 12 is applied through an input control circuit 14 to both an integer register 16 and a decimal register 17 so that the integer portion of the information is registered in the integer register 16 while the decimal portion thereof is registered in the decimal register 17. For example, digital values in the unit and higher places are registered in the integer register 16 while those in the tenth and lower decimal places are registered in the decimal register 17. Any digital value in the unit place may be expressed in millimeters and a digital value in the tenth decimal place may be expressed in tenths of 1 millimeter.

An integer comparison circuit 40 is connected to the integer register 16 to compare the digital value in the latter with a count provided by an integer pulse counter 42 thereby to produce an output serving to translate a machine table 22 through a speed switching circuit 20, AC motor 32, a reduction and stop mechanism 30 and a feed screw 29 identical to those as previously described in conjunction with FIG. 1 and in such a direction that a difference between the digital value and count compared by the comparison circuit 40 decreases. The translation of the machine table 22 causes a position detection resolver 28' to be rotated through a rack member 24 and a pinion gear 26 such as previously described in conjunction with FIG. 1. Here, one complete rotation of the resolver's shaft (not shown in FIG. 2) has been selected to correspond to a distance of translation of the machine table 22 equal to 1 millimeter. Thus the number of rotation of the resolver's shaft provides a distance in millimeters by which the table has been translated.

On the other hand, a decimal comparison circuit 44 is operative to compare the digital value in the decimal register 17 with a count provided by a decimal pulse counter 46 to cause a positive and negative pulse generating circuit 48 to generate pulses tending to decrease a difference between the digital value and count compared by the decimal comparison circuit 44. The decimal pulse counter 46 connected to the pulse generating circuit 48 has counted and contained a digital value given by the decimal portion of the just preceding information. Thus the pulse generating circuit 48 is operative to generate the pulses whose number is equal to a difference between the digital values registered in the register and counter 17 and 46 respectively and then put in its inoperative state. The pulses from the generating circuit 48 are applied to a pulse motor 50 to rotate a shaft of a correction resolver 52 mechanically connected to the motor for purpose of correcting the location of the machine table 22 corresponding to the decimal portion of the particular information.

As shown in FIG. 2, the angle of rotation of the detection resolver 28' is supplied to the correction resolver 52 where an angle through which the resolver 52 has been rotated is electrically subtracted from the said angle of rotation. The difference between both the angles of rotation is applied to a shaping and differentiating circuit 54. In the circuit 54, the output from the correction resolver 52 is shaped into square waveforms which are, in turn, differentiated to form one pulse for each unit, in this case, 1 millimeter of translation of the machine table 22. Then the pulses from the circuit 54 are applied to the integer pulse counter 42. A digital value counted by the counter 42 is compared with that registered in the integer resister 16 as above described until the difference therebetween has zero value. At that time the motor 32 and therefore the feed screw 29 terminates to be rotated whereupon the particular location is completed.

Because of the use of the correction resolver and pulse motor 52 and 50, respectively, the arrangement as illustrated in FIG. 2 is disadvantageous in view of the standpoint of durability. In addition, the particular positions of the machine table 22 where it is to switch its speed from the high to moderate magnitude, and thence to the low magnitude and finally to zero magnitude cannot be finally selected. In this example, a minimum spacing between a pair of such positions corresponds to 1 millimeter. This causes an increase in locating time and imposes a limitation on the accuracy of location.

The invention contemplates to eliminate the above-mentioned and other disadvantages of the conventional devices such as illustrated in FIGS. 1 and 2.

Figure 3:
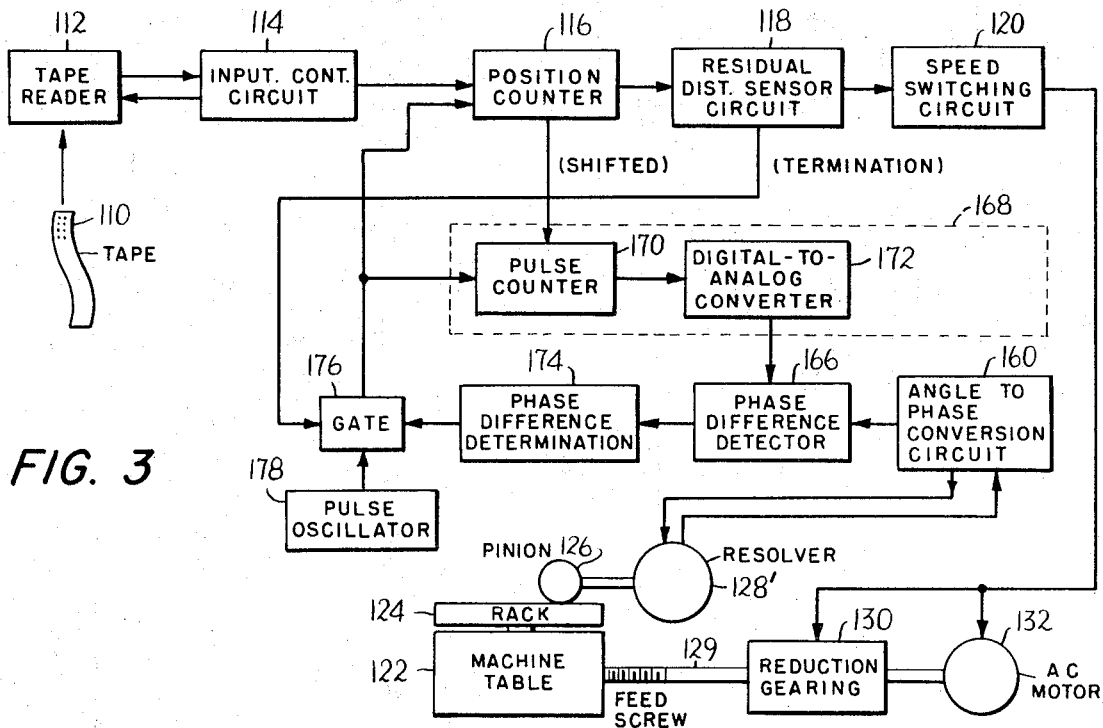
FIG. 3 is a block diagram of an embodiment constructed in accordance of the locating device of the invention.

Referring now to FIG. 3 wherein the components similar or corresponding to those shown in FIGS. 1 and 2 are designated by the same reference numerals in the 100 series, there is illustrated one embodiment of the invention. In FIG. 3, a detection resolver 128' converts the particular translation of a movable output member comprising a machine table 122 to the corresponding angle of rotation through a rack member 124 and a pinion gear 126. Then the converted angle of rotation signal from the resolver 128' is applied to an angle-to-phase conversion circuit 160 where it is converted to an electrical angle of phase in the manner as will be subsequently described. The output from the conversion circuit 160 is fed back to the resolver 128'.

Figure 4:
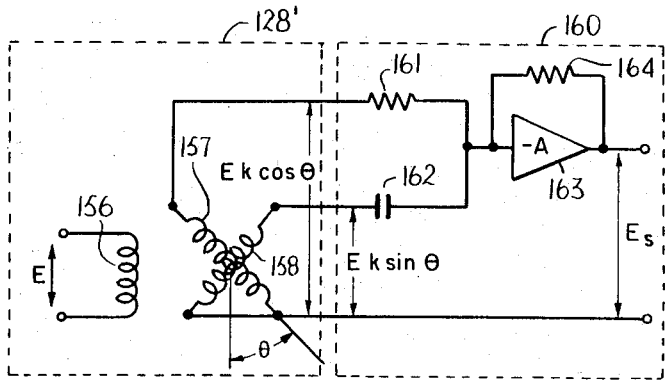
FIG. 4 is a schematic circuit diagram of an angle to phase converter which may be used in practicing the invention.

As shown in FIG. 4, the detection resolver 128' preferably comprises a stator winding 156 and a pair of rotor windings 157 and 158 spatially orthogonal to each other and having a common rotary shaft (not shown) adapted to be rotated by the associated component such as the pinion gear 126. The stationary winding 156 has applied thereacross a reference voltage $E$ in the form of a sinusoidal wave. When the rotor windings 157 and 158 have been rotated about the common axis of rotation through angle $\theta$ measured from their reference position the windings 157 and 158 will have induced thereacross AC voltages of $Ek \cos \theta$ and $Ek \sin \theta$ respectively where $k$ represents a ratio of transformation. The rotor windings 157 and 158 are connected together at one end to one input to the angle-to-phase conversion circuit 160 and at their other ends to a pair of other inputs thereto.

Figure 5:
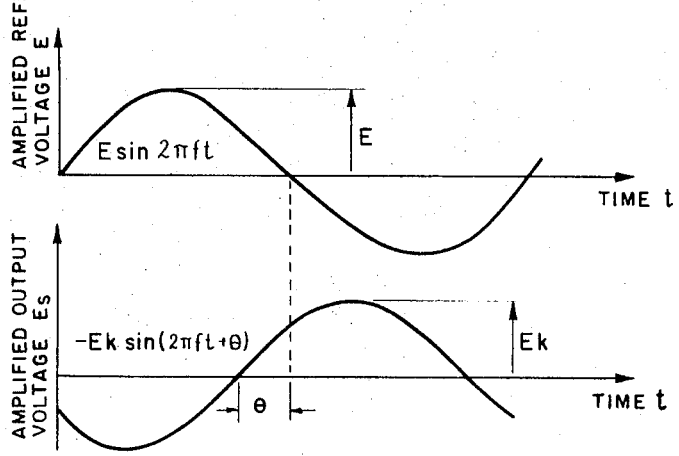
FIG. 5 is a graph illustrating waveforms of the input to and output of the converter shown in FIG. 4.

The other inputs to the circuit 160 are formed of a resistor 161 having a resistance of $R$ and a capacitor 162 having a capacitance of $C$ respectively. The resistor and capacitor 161 and 162 are connected respectively to an adder amplifier 163 having an amplification factor of $A$ very large as compared with one and a resistor 164 through which the output is negatively fed back to the input. The voltages across the rotor windings 157 and 158 cause currents to flow through the resistor and capacitor 161 and 162 respectively. The current flowing through the resister 161 is in phase with the reference voltage $E$ while the current flowing through the capacitor 162 leads in front of the reference voltage by an electrical angle of $\pi/2$ radians. Assuming that $$R = \frac{1}{2\pi f C}$$

where $f$ is the frequency of the reference voltage, the sum of both currents added by the adder amplifier 163 provides an output voltage $Es$ expressed by $Es = Ek \sin(2\pi ft) \cos \theta + Ek \cos(2\pi ft) \sin \theta$
$= -Ek \sin(2\pi ft + \theta)$ In FIG. 5, the upper curve plots the reference voltage $E \sin 2\pi ft$ against time and the lower curve plots the output voltage $-Ek \sin(2\pi ft + \theta)$ against time. Thus it will be readily seen that a mechanical angle $\theta$ has been converted to an electrical angle of phase having the same magnitude of $\theta$.

Referring back to FIG. 3, the output voltage thus produced across the output of the angle-to-phase conversion circuit 160 is supplied to a phase difference detector 166 having also applied thereto an output from a digital phase modulator 168 shown as including a pulse counter 170 and a digital-to-analogue phase converter 172 as will be described hereinafter. The detector 166 provides a difference in electrical angle of phase or phase angle between both the outputs which is, in turn, applied to a phase difference determining circuit 174. Only when having determined a phase difference other than zero, the determining circuit 174 produces a control signal to gate a gate circuit 176, thereby to permit pulses produced at a predetermined constant pulse repetition frequency by a pulse oscillator 178 to pass through the gate circuit 176 to both a position counter 116 and the pulse counter 170 of the digital phase modulator 168. The pulses entered into the position counter 116 are processed and exhibit the effect as previously described in conjunction with FIG. 1.

As shown in FIG. 6, the digital phase modulator 168 is preferably composed of a pulse generator 180 for generating pulses at a predetermined constant pulse frequency, for example, 240 kilocycles per second and an addition-subtraction circuit 182 connected to the pulse generator 180. The circuit 182 has further two inputs one of which has applied thereto the pulses $F$ produced by the pulse oscillator 178 and passed through the gate circuit 176 and the other of which has applied thereto a control signal serving to operate the circuit 182 to selectively perform either an addition or a subtraction. Assuming that the pulse generator 178 produces the square pulses at a predetermined constant pulse repetition frequency of $f$ kilocycles per second, the circuit 182 produces at the output square waveforms having a pulse repetition frequency of $240 \pm f$ kilocycles per second as the case may be. These square waveforms are applied to a frequency divider of counter type 184 where the pulse repetition frequency is divided by a predetermined factor for example a factor of 600. Thus in this case, the divider 184 provides an output of square waveform having a pulse repetition frequency of $$400 \pm \frac{f}{600}$$

cycles per second. The last-mentioned output is applied to the phase difference detector 166 to be compared with the output from the angle-to-phase conversion circuit 160.

In the absence of the input pulses $F$ from the gate circuit 176, the divider 184 provides square pulses at 400 kilocycles per second. These pulses are shown at waveform $a$ in FIG. 7 and may be regarded as having a reference phase. This is because a time point at which the 300th pulse appear is delayed. If $n_1$ of input pulses $F$ from the gate circuit 176 are applied to the circuit 182 put in the subtraction mode of operation for a period of time not more than ½ cycle of 400 cycle alternating current, that is, $n_1$ of negative pulses are applied to the circuit for the same period of time, then a time point at which a 300th pulse appears delayed. Therefore the square waveform provided by the divider 184 lags behind the reference waveform $a$ by a phase angle of $$360° \times \frac{n_1}{600}$$

as shown at waveform $b$ in FIG. 7. Now assuming that $n_2$ pulses $F$ from the gate circuit 176 are applied to the circuit 182 put in the addition mode of operation for a period of time not more than ½ cycle of 400 cycle alternating current, that is, that $n_1$ positive pulses applied to the circuit 182 for the same period of time, a time point at which a 300th pulse appears fast. Accordingly the output waveform from the divider 184 will lead the reference waveform $a$ by a phase angle of $$360° \times \frac{n_2}{600}$$

as shown at waveform $c$ in FIG. 7.

In this way, the number of pulses for a given period of time has been converted to an analogue quantity representing an angle of phase which is, in turn, supplied to the phase difference detector 166 as previously described.

Referring again back to FIG. 3, the number of pulses entered into the pulse counter 170 is converted to the electrical angle of phase by the digital-to-analogue phase converter 172. In other words, the converter 172 provides the output waveform having an angle of phase varied by an amount corresponding to the number of pulses applied to the counter 170 for a given period of time. It is noted that the angle of phase varies in such a direction that the phase difference detected by the phase difference detector 166 tends to decrease. In this way, the pulses from the pulse oscillator 178 are applied through the open gate circuit 176 to the pulse counter 170 until the phase difference detected by the detector 166 reaches zero magnitude. At that time the phase difference determining circuit 174 terminates to provide the output whereupon the gate circuit 176 is closed to prevent the pulses from the pulse oscillator 178 from passing to the pulse counter 170.

If the detector resolver 128' is again rotated in the same direction after the gate circuit 176 has been closed, then the circuit 176 is again opened to repeat the process as above described with the result that the total number of pulses permitted to pass through the gate circuit 176 has been converted to an angle of rotation through which the resolver 128' has responded to the particular translation of the machine table 122 to be driven.

As above described, the pulses from the oscillator 178 passed through the gate circuit 176 are also supplied to the position counter 116 after which they are processed in the manner as previously described in conjunction with FIG. 1. As soon as a residual distance sensor circuit 118 has sensed the counter 116 clearing away, it applies a termination signal to the gate circuit 176 to prevent the pulses from the oscillator 178 from entering both the counters 116 and 170. Simultaneously the circuit 120 operates to stop the AC motor 132 and therefore the machine table 122.

However, after the motor 132 has stopped, the machine table 122 will run somewhat further due to its inertia. Upon completely stopping the machine table 122, the output from the digital-to-analogue converter 172 remains different in angle of phase from that of the angle-to-phase conversion circuit 160.

Then if the succeeding information representing a translation of the machine table 122 in the same direction as the just preceding information is entered from a tape 110 into the position counter 116, the process as previously described in conjunction with FIG. 3 is repeated. That is, the gate circuit 176 is opened to permit the pulses from the pulse oscillator to be applied to both the counters 116 and 170.

On the contrary, if the succeeding information on the tape 110 instructs the machine to translate the table 122 in the direction opposite to that in the just preceding information, then the machine table 122 is translated in the opposite direction while the gate circuit 176 remains closed until the distance by which the machine table 122 previously ran due to its inertia reaches zero magnitude. Then a new phase difference between the output from the converter 172 and the conversion circuit 160 causes the gate circuit 176 to be open whereupon the process as previously described begins to be repeated.

Therefore the invention may be modified so that with the particular information on the tape instructing to translate the machine table in one or positive direction, the gate circuit 176 is arranged to be open only when the angle of phase provided by the angle-to-phase conversion circuit 160 leads that provided by the digital-to-analog converter 172 while with the information instructing the opposite or negative direction, the gate circuit is arranged to be open only when phase relationship between the converter circuits 160 and 172 is reversed from that for the positive direction. Under these circumstances, it is to be noted that the pulses applied to the pulse counter 174 or the addition subtraction circuit 181 have their polarity dependent upon the direction of translation of the machine table instructed by the particular information whereas the same pulses applied to the position counter 116 have their polarity such that they are counted down or subtracted.

Further the invention may be modified so that, in consideration of running of the machine table 122 due to its inertia after stopping of the motor 132, the residual distance sensor circuit 118 delivers a termination signal to the gate circuit 176 shortly before the position counter 116 will have cleared away for the purpose of improving the accuracy of location. In this case, the machine table may stop short of the command position. In order to prevent any deviation between the particular position where the machine table stops and its command position, a digital value left in the position counter 116 at the instant the machine table 122 has stopped short of the command position is shifted to the pulse counter 170 thereby to cause the position counter 116 to clear away. Then the residual value entered into the counter 170 is used to compensate for the just succeeding translation of the machine table 122.

Figure 8:
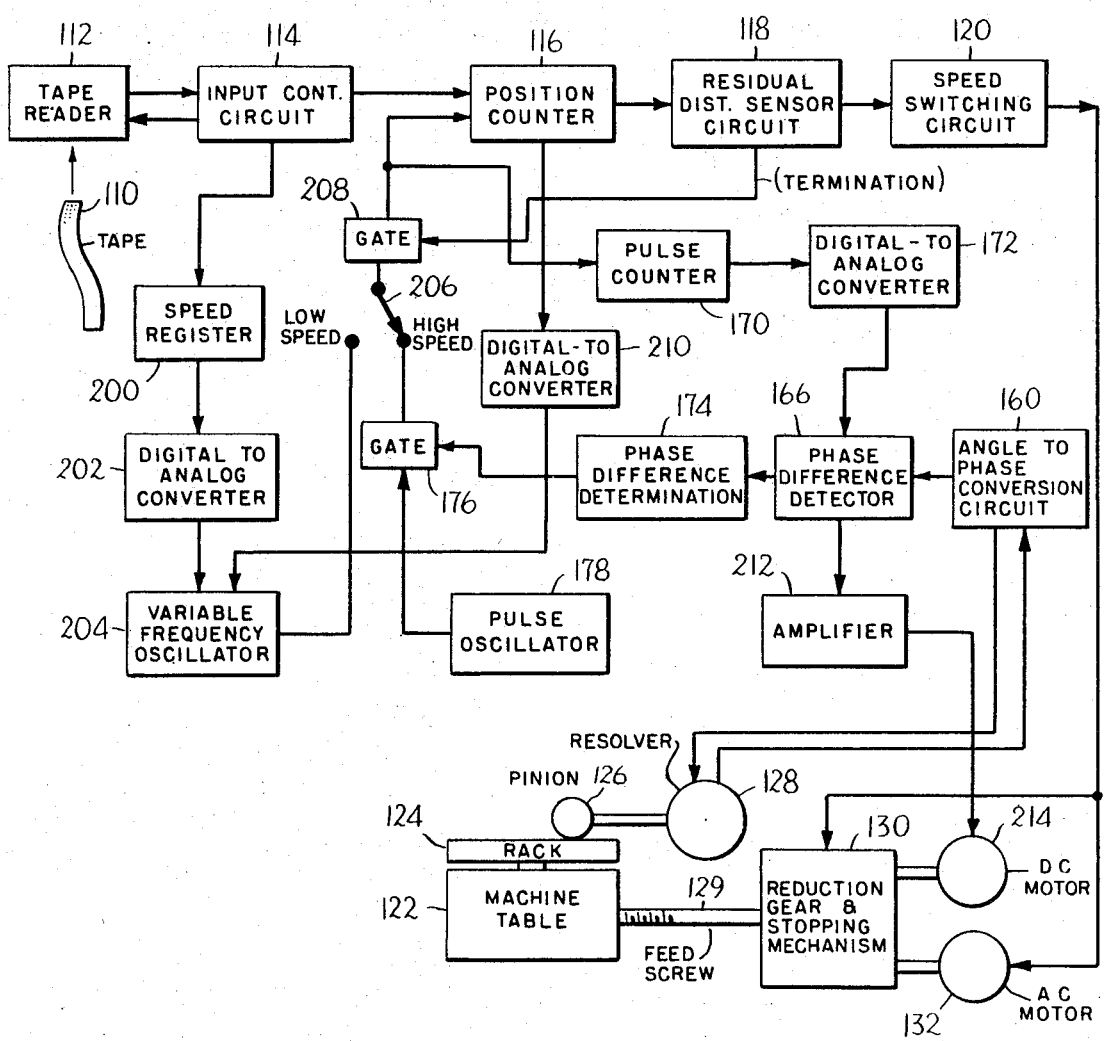
FIG. 8 is a block diagram illustrating one application of the invention to numeral control of a machine tool.

Referring now to FIG. 8 wherein the same reference numerals have been employed to identify the components corresponding to those shown in FIG. 3, there is illustrated one application of the invention to numeral control of a machine tool wherein a speed information is additionally utilized to control a speed at which a machine table involved is translated. By comparing FIG. 8 with FIG. 3 it will be appreciated that an arrangement illustrated comprises, in addition to all the components as shown in FIG. 3, a speed register 200, a digital-to-analogue voltage converter 202, and a variable frequency pulse oscillator 204 connected in series circuit relationship and to an input control circuit 114. The oscillator 204 has an output connect one of two stationary contact labeled LOW SPEED of a switch 206 having the other stationary contact labeled HIGH SPEED connected to a gate circuit 176. The switch 206 includes an arm connected to another gate circuit 208 controlled by a residual distance sensor circuit 118 and connected at the output both a position counter 116 and a pulse counter 170.

Further a phase difference detector 166 is connected to an amplifier 212 to energize a DC motor 214 mechanically connected to a reduction and stop mechanism 130.

A tape 110 shown in FIG. 8 includes, in addition to the position informations, speed informations determining different speeds at which a machine table 122 is translated. It is assumed that the particular speed information determines any one of high, moderate and low speeds. A set of the position and speed informations is read out by a tape reader 112 and then registered in the position counter and speed register 116 and 200 respectively through the input control circuit 114. Then they are converted to the corresponding DC voltages by the digital-to-analogue converters 216 and 206 respectively.

If the position counter 116 is greater in digital value than the speed register 200, that is to say, if the machine table 122 is remote away from its command position then a control (not shown) is operated to connect the arm of the switch 206 to the contact labeled HIGH SPEED and to apply to the variable frequency oscillator 204 the output from the converter 202. On the contrary, if the position counter 116 is smaller in digital value than the speed register 202 then the arm of the switch 206 is on the contact labeled LOW SPEED and the oscillator 204 is adapted to receive the output from the converter 210. The oscillator 204 produces pulses at a variable pulse repetition frequency controlled by the converter 202 or 210 as the case may be, the frequency corresponding to the particular speed at which the machine table 122 is translated.

With the machine table translated at the high speed the arrangement is operated in the manner as previously described in conjunction with FIG. 3. It is to be noted that pulses from a pulse oscillator 178 pass through both a gate circuit 17 and the gate circuit 208 normally open and that the DC motor 214 maintains inoperative. The digital value in the position counter 116 gradually decreases as shown in FIG. 9a wherein the output from the associated converter 210 plots against a distance. FIG. 9b shows the output from the converter 202 plotting against the distance. That is, the converter 202 selectively provides one of its output labeled SPEED 1, 2 and 3 according to the particular speed information. This has immediately no effect on the system.

When the position counter 116 coincides in digital value with the speed register 202 the switch 108 switches to its low speed position and the variable frequency oscillator 204 switches its input from the converter 202 to the converter 210 by any suitable means (not shown). The coincidence of the digital value may be, for example, sensed by a voltage comparing and switching circuit 24 shown in FIG. 2 of the copending application Ser. No. 784,856, filed Dec. 18, 1968, for "Locating Speed Reduction Device." The pulses from the oscillator 204 are applied through the gate circuit 208 to the position counter 116 which, in turn, counts down to decrease the magnitude of output from the associated converter 210 with the result that the pulse repetition frequency of the oscillator 204 progressively decreases as shown at straight line with a slope of $k$ in FIG. 9c.

Under these circumstances the AC motor 132 is deenergized and a phase difference detector 166 having one input affected by the number of pulses from the oscillator 204 is operated in the same manner as previously described in conjunction with FIG. 3 and drive the DC motor 214 through the amplifier 212 whereby the machine table 122 is translated at a speed decelerated along the inclined lines shown in FIG. 9c while at the same time the rotation of a detection resolver 128' is fed into the phase difference detector 166 through an angle-to-phase conversion circuit 160. The digital value in the position counter 116 decreases and the machine table 122 decelerated until the counter 116 clears and simultaneously the speed of the machine table 122 becomes zero at the command position. In this way the machine table has stopped at the command position. Even though the machine table has overshot or undershot the command position, its deviation from the latter can be corrected by a route traced from the detection resolver 128' through the angle-to-phase conversion circuit 160 and the amplifier 212 to the DC motor 214 resulting in the machine table being located at the command position with a high accuracy.

From the foregoing it will be appreciated that the invention is particularly advantageous in fast location. More specifically, the tape 110 has recorded thereon a mark "representing fast feed" and the switch 206 is in its high speed position. Then the process as previous described in conjunction with FIG. 3 is repeated until the machine table 122 approaches its command. This may be sensed by the residual distance sensor circuit 118 or manner as above described. Then the switch 206 switches to its low speed position after which the machine table 122 is decelerated along the reduction line as shown in FIG. 9c as above described. In this case a speed at which the machine table begins to be decelerated may be preferably preset to equal the maximum speed of rotation of the DC motor 214. If the machine table is in its position labeled ACTUAL POSITION in FIG. 9, it can be first translated at any one of SPEED 1, 2 and 3 in accordance with the particular speed information and then decelerated as shown in FIG. 9c until it is caused to stop at desired position labeled COMMAND POSITION.

Also it will be appreciated that the reduction line as shown in FIG. 9c is suitable for the cutting operation.

The invention has several advantages. For example, it is not substantially affected by mechanical vibrations. Also it is excellent in immunity to noise and high in durability while a locating speed is high. Thus the invention is effectively applicable to a variety of devices for converting a mechanical angular position to a digital quantity.

While the invention has been illustrated and described in conjunction with a few preferred embodiments thereof. It is to be understood that numerous changes and modifications may be resorted to without departing from the spirit and scope of the invention. For example, instead of the rack member and pinion gear 124 and 125 respectively, a gearing may be used so long as it does not call the accuracy of location in question. Also a linear resolver may be directly secured to the machine table to serve as an analogue detector.

I claim:

1. In a locating device for locating a movable output member at a command position, the combination of a movable output member, positioning means for positioning said movable output member in accordance with a locating signal, analogue position detector means for detecting a magnitude of movement of said movable output member in an analogue manner, a pulse oscillator operable to produce pulses at a predetermined constant pulse repetition frequency, a gate circuit, a pulse counter operative to count the pulses from said pulse oscillator through said gate circuit, a digital-to-analogue converter operative to convert the output from said pulse counter to an analogue quantity, difference detector means for comparing the output from said analogue position detector with the analogue output from said digital-to-analogue converter to detect whether or not a difference exists therebetween and operative in the presence of said difference to gate said gate circuit to permit the pulses from said pulse oscillator to pass therethrough, a position counter for registering a position information instructing said command position and counting down the pulses passed through said gate circuit, and means responsive to the output from said position counter for producing a locating signal.

2. A locating device as claimed in claim 1 wherein said analogue position detector means includes a resolver.

3. A locating device as claimed in claim 1 wherein said means for producing a locating signal includes a residual distance sensor circuit connected to said position counter to sense the residual distance of the moving member up to said command position from the digital value remaining in said position counter, and a speed switching circuit responsive to the output from said sensor circuit to selectively switch the speed of said positioning means from a high magnitude to a moderate magnitude and then to a low magnitude.

4. A locating device as claimed in claim 1 wherein said pulse counter and said digital-to-analogue converter consist of a pulse generator for generating pulses at a predetermined constant pulse repetition frequency, a pulse counting circuit connected to said pulse generator to count up the pulses therefrom and having applied thereto the pulses passed through said gate circuit to count them in one of the up and down directions dependent upon a control signal applied thereto to produce the corresponding pulse repetition frequency, and a frequency divider circuit connected to said pulse counting circuit to divide said pulse repetition frequency provided therefrom by a predetermined number.